United States Patent [19]

Hedley et al.

[11] Patent Number: 4,953,107

[45] Date of Patent: Aug. 28, 1990

[54] VIDEO SIGNAL PROCESSING

[75] Inventors: David J. Hedley, Winchester; John W. Richards, Chilbolton, both of United Kingdom

[73] Assignee: Sony Corporation, Tokyo, Japan

[21] Appl. No.: 401,555

[22] Filed: Aug. 28, 1989

Related U.S. Application Data

[63] Continuation of Ser. No. 921,237, Oct. 21, 1986, abandoned.

[30] Foreign Application Priority Data

Oct. 21, 1985 [GB] United Kingdom ................ 8525925

[51] Int. Cl.[5] ............................................ G06F 3/153
[52] U.S. Cl. .................................. 364/522; 364/521; 340/747
[58] Field of Search ............... 364/521, 522, 518, 526; 340/728, 729, 747, 750, 798, 799; 382/46

[56] References Cited

U.S. PATENT DOCUMENTS

| | | | |
|---|---|---|---|
| 4,213,252 | 7/1980 | Sullivan et al. | 364/521 |
| 4,283,765 | 8/1981 | Rieger | 364/521 |
| 4,343,037 | 8/1982 | Bolton | 364/521 |
| 4,371,872 | 1/1983 | Rossman | 340/728 |
| 4,610,026 | 9/1986 | Tabata et al. | 382/47 |
| 4,611,232 | 9/1986 | Searby | 358/160 |
| 4,660,157 | 4/1987 | Beckwith et al. | 364/522 |
| 4,667,236 | 5/1987 | Dresdner | 358/160 |
| 4,677,574 | 6/1987 | Kausch | 364/521 |
| 4,682,160 | 7/1987 | Beckwith, Jr. et al. | 340/729 |
| 4,682,217 | 7/1987 | David et al. | 358/89 |
| 4,689,677 | 8/1987 | Hedley et al. | 358/160 |
| 4,695,959 | 9/1987 | Lees et al. | 364/458 |
| 4,697,178 | 9/1987 | Heckel | 340/729 |
| 4,701,863 | 10/1987 | Bruce | 364/518 |
| 4,718,024 | 1/1988 | Guttag et al. | 364/518 |
| 4,751,660 | 6/1988 | Hedley | 364/518 |
| 4,754,269 | 6/1988 | Kishi et al. | 340/729 |
| 4,825,391 | 4/1989 | Merz | 364/526 |
| 4,855,937 | 8/1989 | Heartz | 364/521 |
| 4,860,217 | 8/1989 | Sasaki et al. | 364/518 |

FOREIGN PATENT DOCUMENTS

| | | |
|---|---|---|
| 0116737 | 8/1984 | European Pat. Off. |
| 0137233 | 4/1985 | European Pat. Off. |
| 2563401 | 10/1985 | France |
| 2051525 | 7/1981 | United Kingdom |
| 2119594 | 11/1983 | United Kingdom |
| 2138252 | 3/1984 | United Kingdom |
| 2171579 | 8/1986 | United Kingdom |

OTHER PUBLICATIONS

Computer Technology Review, vol. 4, No. 4, 1984, pp. 153, 156, 158, 159, U.S.; A. Bridges: "Multiple Processors Optical Disk Recorders Boost Graphics Systems".
E. D. N. Electrical Design News, vol. 28, No. 18, 1983, pp. 119-122 & 124, U.S.; K. Shoemaker: "Understand the Basics to Implement 3-D Graphics".

Primary Examiner—Gary K. Harkcom
Assistant Examiner—Phu R. Nguyen
Attorney, Agent, or Firm—Lewis H. Eslinger; Jay H. Maioli; Donald S. Dowden

[57] ABSTRACT

Apparatus for generating an image for digital scene simulation, the apparatus comprising a first store for storing address data defining the three-dimensional shape of an object, a second store for storing video data defining the two-dimensional surface detail of the object, a matrix circuit for manipulating the address data to move the object (by translating it, changing its orientation, or both translating it and changing its orientation), a perspective transformation device for perspective tansforming the manipulated address data to form transformed address data defining a two-dimensional image of the object after the manipulation, and a third store in which the video data is written, under control of the transformed address data, in the form of output video data defining a two-dimensional image of the object after the manipulation and with the surface detail.

14 Claims, 8 Drawing Sheets

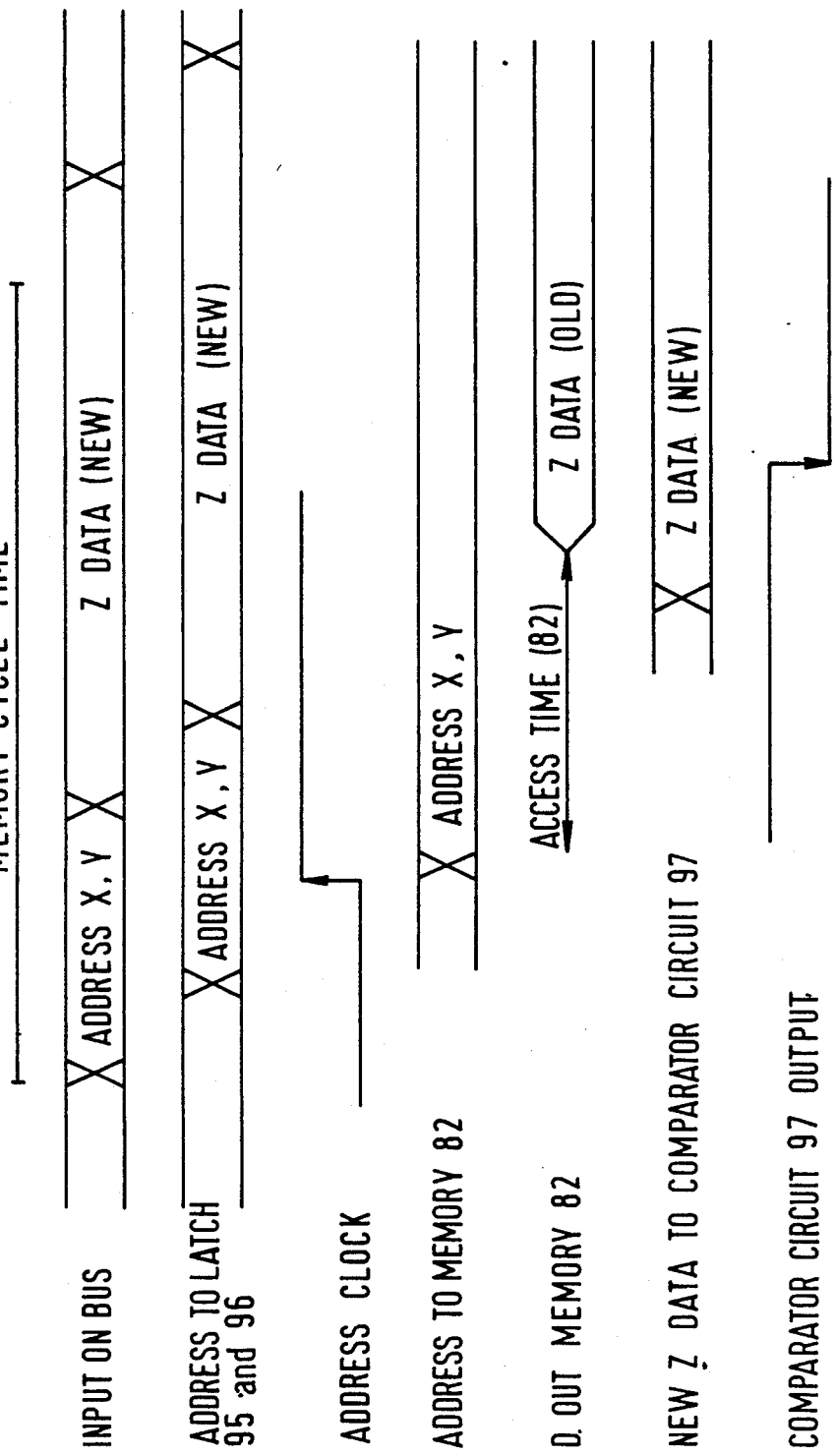

VIDEO SIGNAL PROCESSING

This is a continuation of application Ser. No. 06/921,237, filed Oct. 21, 1986, now abandoned.

BACKGROUND OF THE INVENTION

1. Field of the Invention

This invention relates to video signal processing. More particularly, the invention relates to methods of and apparatus for the generation and manipulation of images in three dimensions.

The images so produced may form part of a complete scene which has been simulated by the addition of the images to a background video signal. The resulting complete scene may, for example, be used as the moving display in a simulator, such as a flight simulator; as the moving display in a video game; and also more generally where digital scene simulation is required, such as in film-making.

2. Description of the Prior Art

Hand drawn animated films such as the Disney cartoons have been well known for a long time, but are time-consuming and expensive to produce. Recently, models have also been extensively used in film-making, the models being manipulated frame by frame to achieve the required animation. Again this is time-consuming and expensive.

More recently, so-called digital scene simulation has been used, the object of this technique being to generate frame by frame within a computer, images of animated scenes for video or film. No limitation on the range of scenes is implicit in the technique, although a particular application has been the generation of scenes for science fiction films. A feature of digital scene simulation is the immense amount of data that needs to be stored and processed, and the consequent requirement for very large computational power. For example, Upson suggests in "Large scale digital scene simulation for feature films and commercial productions" presented at Computer FX'84, and published by Online Publications, Pinner, UK, 1984, that for a $2 \times 10^7$ pixel frame, up to $1.2 \times 10^{11}$ computations per frame may be required. The fastest general purpose computer currently available is probably the CRAY XMP which can carry out up to $2 \times 10^8$ computations per second, so even that computer takes many seconds to produce a single frame. A slower, less expensive computer may well take hours to produce a single frame.

A central problem in digital scene simulation is the generation and manipulation of three-dimensional objects and it is with this problem that the present invention is particularly, but not exclusively, concerned.

OBJECTS AND SUMMARY OF THE INVENTION

One object of the present invention is to provide a method of generating an image comprising at least one object and surface detail of the object.

Another object of the present invention is to provide a method of generating an image by deriving and combining separately stored address data relating to at least one three-dimensional shape and video data relating to two-dimensional surface detail of the object.

Another object of the present invention is to provide a method of generating an image by deriving and combining separately stored address data relating to at least one three-dimensional shape, of an object video data relating to two-dimensional surface detail of the object and video data relating to a background.

Another object of the present invention is to provide an improved apparatus for generating an image by combining stored data, and capable of operating in real time.

According to the present invention there is provided a method of generating an image comprising the steps of:

storing address data defining the three-dimensional shape of an object;

storing video data defining the two-dimensional surface detail of said object;

manipulating said address data to move and/or change the orientation of said object in space;

perspective transforming said manipulated address data to form transformed address data defining a two-dimensional image of said object after said manipulation; and using said transformed address data to control the writing of said video data into a store in the form of output video data defining a two-dimensional image of said object after said manipulation and said transformation, and with said surface detail.

According to the present invention there is also provided apparatus for generating an image, the apparatus comprising:

a first store for storing address data defining the three-dimensional shape of an object;

a second store for storing video data defining the two-dimensional surface detail of said object;

first means for manipulating said address data to move and/or change the orientation of said object in space;

second means for perspective transforming said manipulated address data to form transformed address data defining a two-dimensional image of said object after said manipulation; and a third store in which said video data is written, under control of said transformed address data, in the form of output video data defining a two-dimensional image of said object after said manipulation and said transformation, and with said surface detail.

Said output video data may be produced in real time to form a sequence of images for an immediate moving display, or the images may be produced more slowly and stored on a video tape or video disc or film for subsequent display.

The above, and other objects, features and advantages of this invention will be apparent from the following detailed description of illustrative embodiments which is to be read in connection with the accompanying drawings.

BRIEF DESCRIPTION OF THE DRAWINGS

FIG. 12 shows time charts used in explaining the operation of the memory device of FIG. 11.

DESCRIPTION OF THE PREFERRED EMBODIMENTS

An embodiment of apparatus for generating an image and some modifications therefor, all in accordance with the present invention, will first be described relatively briefly, and then some parts of the embodiment will be described in more detail.

Figure 1:
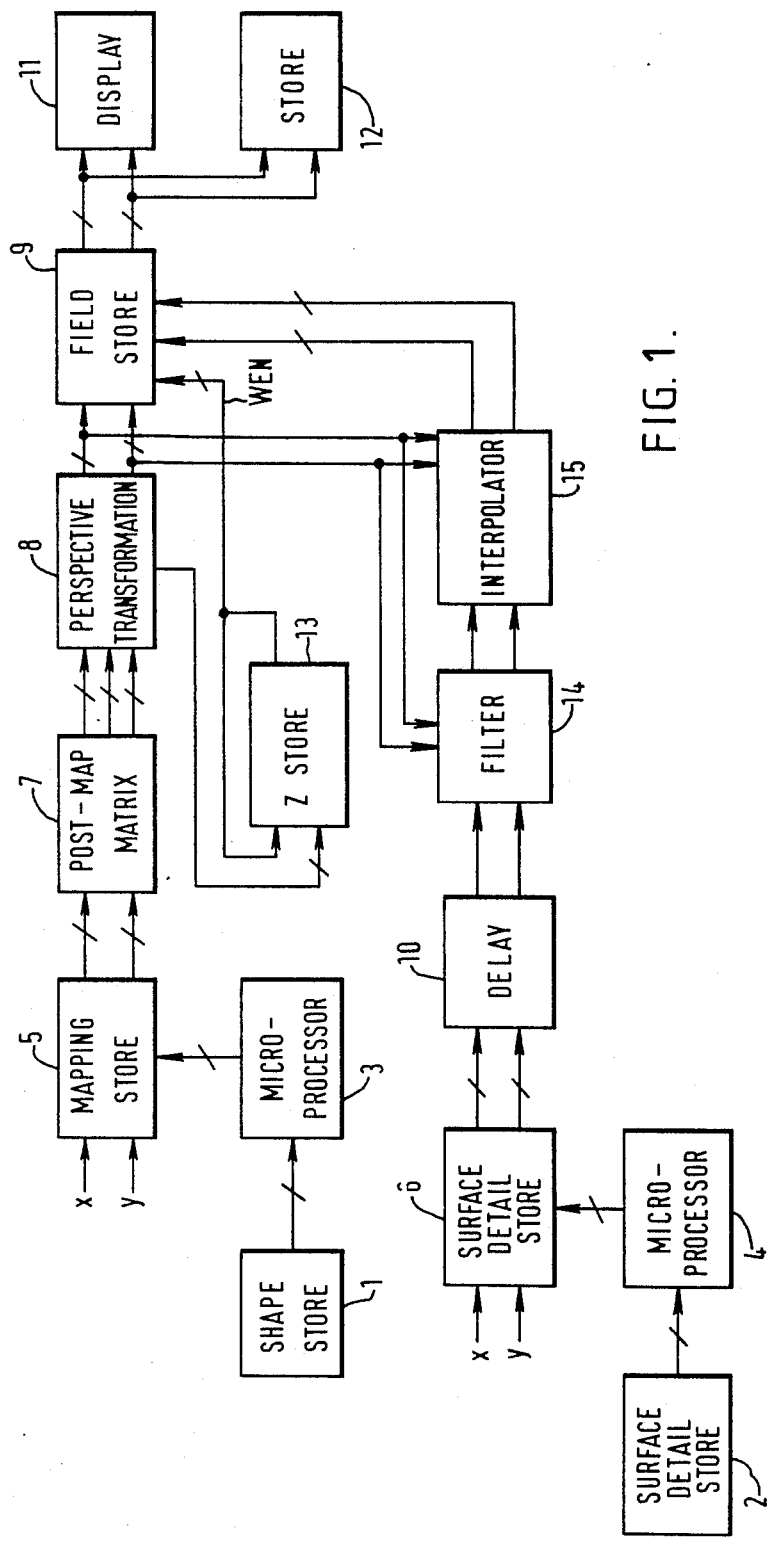
FIG. 1 shows in simplified block form an embodiment of apparatus for generating an image and according to the present invention.

Referring to FIG. 1, the apparatus comprises first and second basic data stores 1 and 2. The store 1 stores address data defining the three-dimensional shape of at least one object, and preferably of a large number of objects, required in the video images to be generated. The store 2 stores video data defining the two-dimensional surface detail of the or each of the objects stored in the shape store 1. The stores 1 and 2 are connected by way of respective microprocessors 3 and 4 to a mapping store 5 and to a further surface detail store 6, respectively. Under control of the microprocessor 3, address data relating to a selected single object can be brought from the shape store 1 and stored in the mapping store 5. Likewise, under control of the microprocessor 4, video data relating to surface detail of the selected object can be brought from the surface detail store 2 and stored in the further surface detail store 6.

The mapping store 5 supplies the address data to a post-map matrix 7 to be manipulated so as to move the object. The manipulated address data are supplied to a perspective transformation device 8 where they are transformed into transformed address data defining in two dimensions an image of the object, which transformed address data are supplied to a field store 9 and form the X and Y writing controls by which the video data relating to the surface detail of that object and derived from the further surface detail store 6 are written into the field store 9 to form output video data. The necessary positional correspondence is achieved by aligning an initial pixel of the surface detail with the correct initial pixel of the shape, and by storing the remaining address and video data in the stores 1 and 2 in corresponding locations. The necessary time correspondence is achieved by a delay device 10 which operates to present the data from the further surface detail store 6 in synchronism with the writing controls from the perspective transformation device 8, these writing controls having been delayed by the operations to which they have been subjected. The field store 9 supplies the output video data which drives a display device 11 such as a television monitor. Alternatively, or in addition, the output video data can be supplied to a more permanent store 12 such as a video tape or a video disc, and it may subsequently be transferred to cinematograph film. The process is then repeated for the next field.

The stores 1 and 2 may be read-only memories, but are preferably random access memories. The address data, defining the shape, can be derived by mathematical calculation, using a computer if necessary, for relatively simple shapes such as cubes or spheres, and by detailed computer analysis or with a model or real object and a digitizer in the case of relatively complex shapes such as aircraft, spacecraft or motor cars. The video data, defining the surface detail, does so in terms of hue, luminance and saturation.

The post-map matrix 7 can perform all the five transformations of off-setting (moving in any direction), scaling (expanding or compressing in size), rolling (rotating), pitching and yawing or any required combination thereof.

The perspective transformation device 8 effects perspective transformation relative to a preselected viewing point and transforms the manipulated address data to transformed address data related to a two-dimensional viewing plane. Other processing may be added. For example, the luminance may be changed in dependence on the depth of the data to enhance perspective by pseudo shading.

Some transformations, such as for example where an object is to be displayed tumbling over and over, involve the need for hidden surface elimination. To control this a Z store 13, referred to in more detail below, is provided to receive Z or depth address data from the perspective transformation device 8, and to supply write enable signals WEN to the field store 8.

Where the transformation involves scaling, some further processing of the video data derived from the further surface detail store 6 will probably be required, and for this purpose a filter 14 and an interpolator 15 are provided in the video data path prior to the field store 9. The filter 14 and the interpolator 15 are each controlled in dependence on the output from the perspective transformation device 8.

The filter 14 is provided to prevent aliasing where the transformation has the effect of compressing the size of the object to which the surface detail is to be applied. Thus, particularly where substantial compression is involved, it is necessary to limit the amount of surface detail data supplied to the field store 9, and this is done by filtration. The actual filtration effected is controlled in dependence on X and Y direction local compression factors, that is factors which represent the degree of compression in that local area of the image currently being processed. The filter 14 includes means continuously to derive the local compression factors, one for the X or horizontal direction and one for the Y or vertical direction, in dependence on the X and Y address outputs of the perspective transformation device 8.

Figure 2:
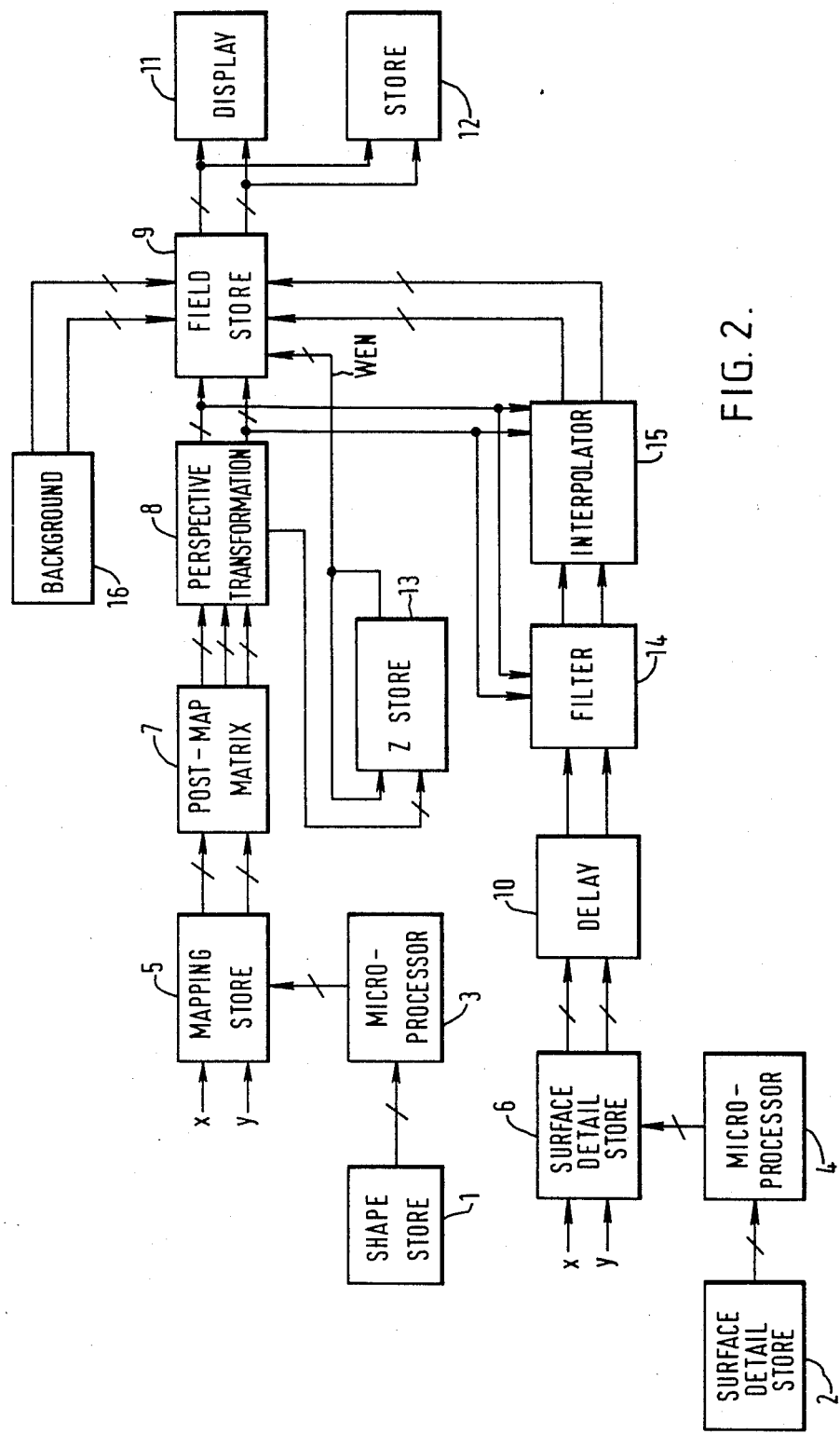
FIG. 2 shows in simplified block form a modified embodiment.

The interpolator 15 is provided to interpolate the surface detail, that is to derive additional sample values for interpolation into the surface detail video data derived from the further surface detail store 6, where the transformation has the effect of expanding the size of the object to which the surface detail is to be applied, that is where greater resolution is required by the field store 9. Briefly, this is achieved by sub-dividing the X and Y addresses derived from the perspective transformation devices 8, so as to produce X and Y direction residuals which define the positions of required interpolated sample values relative to available sample values. Then, to derive a required interpolated sample value, a small array of available sample values, say nine, surrounding the position of the required interpolated sample value, are each multiplied by a respective weighting coefficient and the resulting products are summed to produce the required interpolated sample value. The weighting coefficients may be stored in look-up tables held in a programmable read-only memory in the interpolator 15, and be derived in dependence on the values of the X and Y residuals. This operation is somewhat similar to that effected in a television standards converter.

Where a complex scene with a background, which may be moving, and a plurality of moving objects is to be produced, the modified embodiment of FIG. 2 may be used. In this case the first and second memories 1 and 2 are computer disc stores each of which stores a library of first and second data defining shapes of objects and corresponding surface details. This embodiment is basically the same as that of FIG. 1, but additionally it includes a background source 16, which may comprise a video tape or a video disc or a video camera. In use, the background source 16 first supplies one field of background data to the field store 9. The background data may define a still image or one field of a moving image such as live video.

The address data for the first object are then processed through to the perspective transformation device 8 which supplies the X and Y writing controls for each pixel address of the surface detail of the first object to the field store 9 where the surface detail data over-write the background data already stored, under control of write enable signals WEN from the Z store 13. Additionally, the perspective transformation device 8 in this case supplies the Z data for each pixel address of the surface detail to the Z store 13 where they over-write maximum-value Z data which were written into each pixel address when the background data were written into the field store 9, and cause the write enable signals WEN to be supplied. The data for the second object are then processed through to the perspective transformation device 8 which supplies the Z data for each pixel address of the surface detail of the second object to the Z store 13, where the depth is compared with that of the corresponding already-stored Z data, which may relate to the background or the first object. In the former case, the X and Y data over-write the background data already stored in the field store 9 and a write enable signal WEN is supplied to the field store 9. In the latter case, the X and Y data of the second object only over-write those of the first object in the field store 9, and the write enable signal WEN is only supplied to the field store 9, if the depth of that pixel of the second object is less than the depth of that pixel of the first object. These processes are repeated for any remaining objects.

As an alternative, some depth data may be associated with the background data. For example, if the final image is to comprise aircraft moving in a cloudy sky, then the background data may define blue sky, with each pixel of which maximum-value Z data are associated, and clouds, with each pixel of which selected different Z data are associated. Different clouds can of course be at different depths, and may move from field to field. Thus a moving aircraft may move in front of some clouds and behind others, while a relatively stationary object in the sky, such as the sun, may be covered and uncovered by clouds.

The operation of the Z store 13 in the embodiments of FIGS. 1 and 2 is similar where hidden surface elimination, referred to briefly above, is necessary.

The processing may be carried out in real time with the apparatus of FIG. 1, although this is not essential. Again, in the apparatus of FIG. 2, processing may be carried out in real time if the necessary processing of data for all the required objects can be done sufficiently quickly. Thus within each field period it is necessary to down-load the background data into the field store 9, and successively to process and load the surface detail data for each object into the field store 9. If this cannot be done sufficiently quickly, but nonetheless real time operation is required, then parallel processing can be used.

Figure 3:
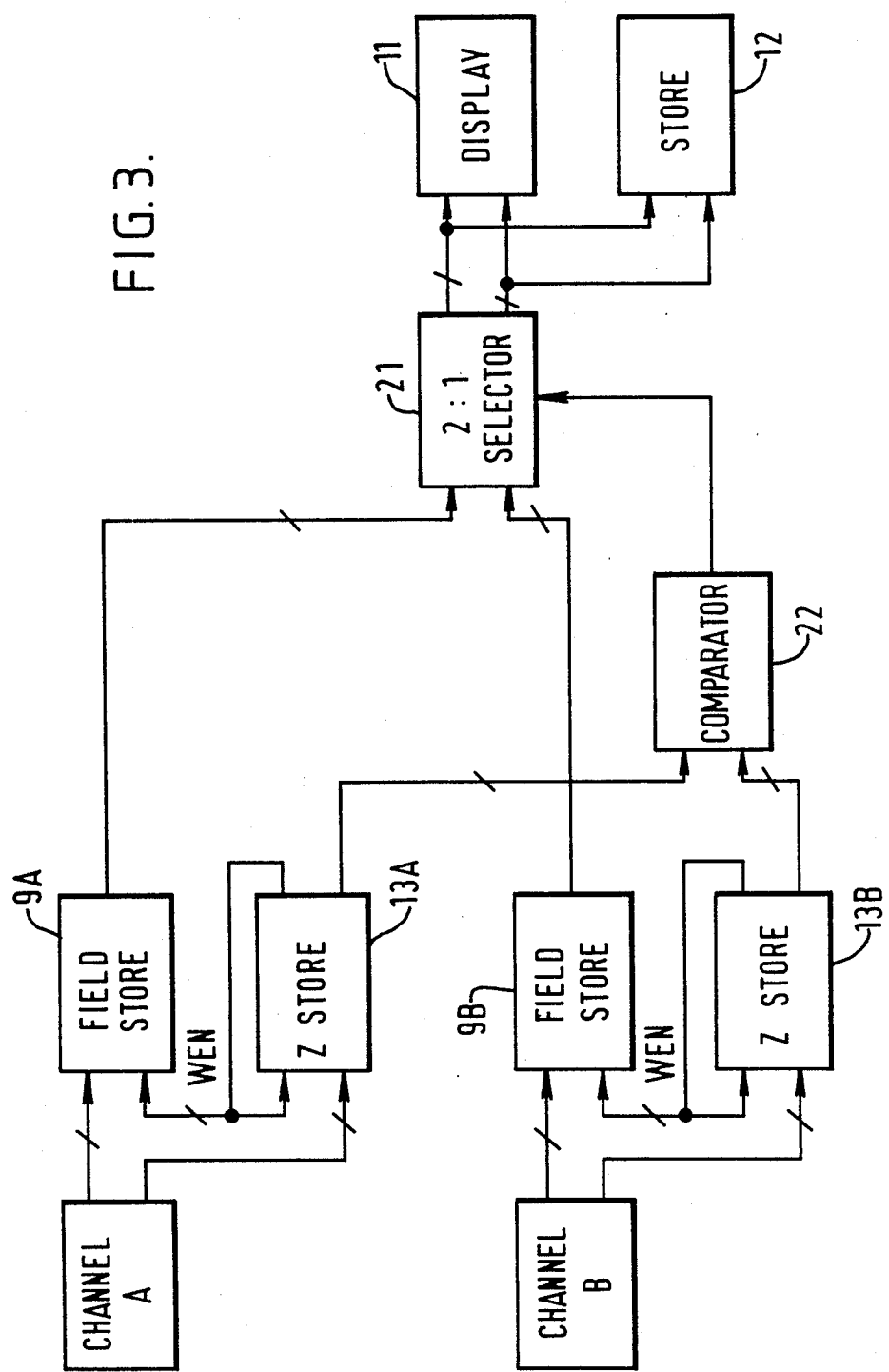
FIG. 3 shows in simplified block form part of a further modified version of the embodiment of FIG. 2.

FIG. 3 shows part of a modified embodiment which can effect parallel processing. The embodiment is shown as having two channels A and B for processing simultaneously data relating to two objects, but further channels can be added as required if data for more objects are to be processed simultaneously. Each channel A, B comprises elements corresponding to the elements 1 to 8, 10, 14 and 15 of the embodiment of FIG. 2. For each channel A, B there is provided a respective field store 9A, 9B with a respective associated Z store 13A, 13B. The background data, if any, may be written into the field store 9A, or alternatively an additional field store (not shown) for the background data, with an associated Z store (not shown) may be provided.

In operation, the X and Y data for each pixel in turn are supplied simultaneously by each field store 9A, 9B to a 2:1 selector 21, while Z data are simultaneously supplied by each Z store 13A, 13B to a comparator 22. The comparator 22 controls the selector 21 to allow through only the X and Y data relating to the object (or the background) with the smallest depth to the display device 11 and/or the permanent store 12. In this modified apparatus it is of course necessary to allow sufficient processing time for each channel A, B to enable the final data to be combined into a single field with all hidden surfaces eliminated.

Although generally both the background and any superimposed objects will be processed with the same resolution, that is the same number of pixels per unit area, this is not essential, as there may be cases where a lower resolution is acceptable or is required for one or the other.

It is thought that the foregoing description will have enabled the main principles of the embodiment and modified embodiments to be understood, but certain parts of the embodiments will now be described in more detail with reference to the remaining figures.

It will be assumed, merely as an example, that the apparatus is to be used to produce images for a high definition video system using 1125 lines per frame and 60 fields per second, and with a picture aspect ratio of 5:3. There are 2048 pixel addresses per horizontal scan line. Each pixel address in each frame is defined by X and Y data comprising respective 11-bit and 10-bit words. Likewise, each pixel address is defined, when the processing so requires, by depth or Z data comprising an 8-bit word.

Where real time operation is required in a television system, a pair of alternately-read output field memories will be required. Thus in the embodiment of FIGS. 1 and 2 the field memories 9 can be duplicated, while in the embodiment of FIG. 3 the selector 21 can feed an additional pair of output field memories.

Figure 4:
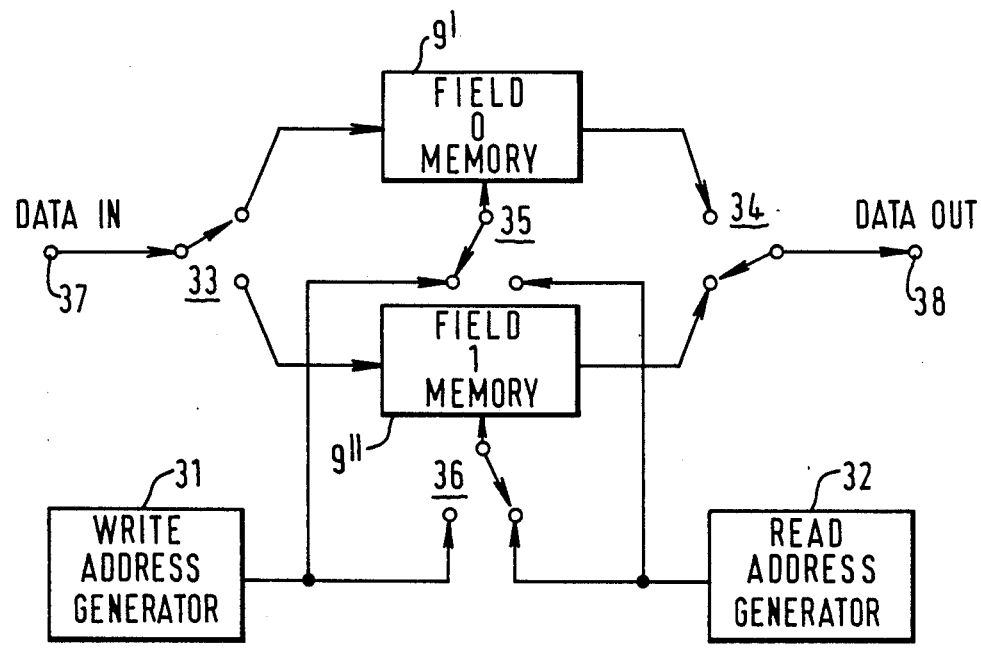
FIG. 4 shows in more detailed block form a memory device of the embodiment of FIG. 1.

For the case of the FIG. 1 embodiment, the arrangement, which is shown in FIG. 4, comprises two field memories, a field zero memory 9' and a field one memory 9", together with a write address generator 31 and a read address generator 32. These elements are interconnected by switches 33, 34, 35 and 36, each of which is operated at the field frequency. Input image data supplied to an input terminal 37 are selectively supplied by way of the switch 33 to the field zero memory 9' or to the field one memory 9″. Output image data for supply to the display device 11 or the permanent store 12 (FIG. 1) are selectively derived by the switch 34 from the field zero memory 9′ or the field one memory 9″. The write address generator 31 and the read address generator 32 are selectively and alternately connected to the field zero memory 9′ and the field one memory 9″ by the switches 35 and 36. Writing proceeds alternately in the field zero memory 9′ and the field one memory 9″ in dependence on the position of the switch 33 and under the control of the write address generator 31. When a complete field has been written in the memory 9′ or 9″, the switches 33 to 36 change position and the image data stored in that memory 9′ or 9″ are then sequentially read out under the control of the read address generator 32, and supplied to an output terminal 38, while the image data for the next field are written in the other memory 9″ or 9′.

The mapping store 5 and associated circuits will now be described in more detail with reference to FIG. 5. The mapping store 5, which effects the required two-dimensional to three-dimensional transformation, has two main inputs designated X and Y and three main outputs designated $\alpha$, $\beta$ and Z. Input x addresses of pixels in a television raster are supplied to the X input, these input x addresses also being supplied to a multiplier 41 connected to the $\alpha$ output. Input y addresses of pixels in the raster are supplied to the Y input, these input y addresses also being supplied to a multiplier 42 connected to the $\beta$ output. X, Y and Z outputs respectively are derived from the multipliers 41 and 42, and the Z output.

The mapping store 5 is a random access memory operating as a look-up table, and is preloaded with data corresponding to the shape of the object selected under control of the microprocessor 3 from the shape store 1. Thus, the mapping store 5 then contains instructions as to how to map x and y coordinates corresponding to the pixel addresses in the raster to the three-dimensional shape of the object. For each pixel address there are stored three parameters: $\alpha$ and $\beta$ which are the X and Y scaling multipliers, and Z which is the absolute depth coordinate. Considering for a moment just one dimension, the effect on each pixel address in a horizontal line scan in achieving the required transformation is likely to be the horizontal movement of that pixel address to a different address. This change of address can be effected by multiplying the x coordinate of the original address by a scaling multiplier. In practice, the required transformation is likely to affect each pixel address by movement in two dimensions, so multiplication of both the x and the y coordinates of the original address of the pixel by respective scaling multipliers is likely to be required. As, therefore, each pixel address is supplied to the X and Y inputs of the mapping store 5, the mapping store 5 operates to access the appropriate scaling multipliers $\alpha$ and $\beta$ for the pixel address and supply them to the $\alpha$ and $\beta$ outputs. Additionally, however, it is likely that the required transformation will also necessitate movement of the pixel address in the third or depth direction, so a further operation of the mapping store 5 is to access and supply to the Z output thereof, the Z coordinate of the address corresponding to the pixel address designated by the x and y coordinates of the input addresses and to the required transformation.

The scaling multipliers $\alpha$ and $\beta$ corresponding to the input pixel addresses are therefore supplied to the multipliers 41 and 42 respectively, which also receive the input x and y addresses respectively of the input pixels. The multipliers 41 and 42 therefore scale the input x and y addresses to the required new values which, together with the Z address derived from the mapping store 5, are supplied to the respective outputs where the resulting addresses are designated X′, Y′ and Z′.

Figure 7:
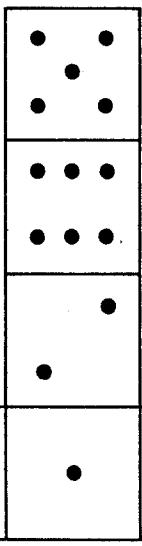
FIG. 7 shows two-dimensional surface detail to be applied to the shape of FIG. 6.
Figure 6:
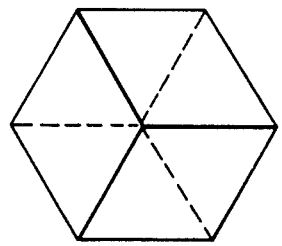
FIG. 6 shows a three-dimensional shape.

This portion of the operation may perhaps be more readily understood by a simple example to be described with reference to FIGS. 6 and 7. Suppose that the first video data stored in the shape store 1 define a plain cubic shape as shown in FIG. 6. Suppose also that the second video data stored in the surface detail store 2 (FIG. 1) define surface detail which will transform the cube into a die. The necessary surface detail is shown in FIG. 7 and forms a two-dimensional development of the three-dimensional surfaces of a die. The images represented by the first and second data should preferably correspond in size, but their positions within the field and orientations are relatively unimportant as a predetermined first-to-be-processed pixel of the surface detail, say the corner of any one of the squares in FIG. 7, can be brought into coincidence with an appropriate pixel of the shape, that is any corner of any face of the cube, and the two data can then be maintained in correspondence.

Thus the output X′, Y′ and Z′ addresses from the mapping store 5 will represent the positions in space of each pixel of the surface detail of the cube, and after these addresses have been further processed as described below they will control where (and whether) each pixel of the surface detail is written in the field store 9 (FIG. 1) to produce the required output video data defining the final image. It should be understood that subsequent changes in the orientation of the die in space in the post-map matrix 7 will alter the surface detail visible in the final image.

Although this simple example of a die has been given, the method is readily applicable to very complex shapes and equally complex surface detail. For example, the shape may be that of a spacecraft, the address data defining the shape of which may have been derived from a model by a digitizer and fed into the shape store 1, while the surface detail video data of the spacecraft may have been drawn or photographed and the necessary data defining it may have been derived by a video camera, digitized, and fed into the surface detail store 2. Moreover, the stores 1 and 2 will usually hold a variety of different sets of data corresponding respectively to different objects and different corresponding surface detail, for selection as required by the microprocessors 3 and 4. Also, although it has been assumed in the foregoing description that the stores 1 and 2 are separate entities, it will be apparent that they may be formed by two parts of a single memory.

Figure 5:
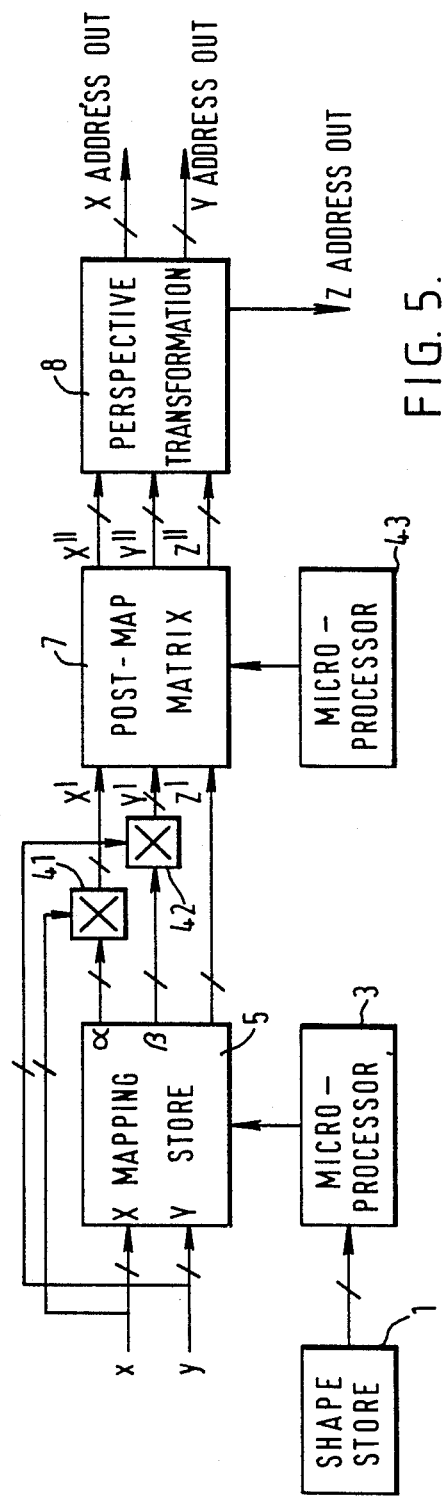
FIG. 5 shows in more detailed block form part of the embodiment of FIG. 1.

FIG. 5 also shows the post-map matrix 7 and the perspective transformation device 8 of FIG. 1.

Briefly, the post-map matrix 7 is operative to cause any one or any combination of the three-dimensional effects of off-setting (which may be in two dimensions only), scaling, rolling, pitching and yawing. These effects also are all well known, and the necessary matrices are described in "Computer Graphics and Applications" by Dennis Harris, Chapman and Hall Computing 1984. To achieve each individual effect a 4×3 matrix is sufficient, but a fourth line is added simply to make the matrices 4×4, so that any two or more matrices can readily be multiplied together to give the required combination of effects, such as rolling about an off-set point, which involves off-setting, rolling and off-setting back, in which case, the three appropriate matrices are multiplied together to give a single matrix corresponding to the required effect. This multiplication is done in a microprocessor 43, and when required the resultant matrix is down-loaded as a set of coefficients for the post-map matrix 7, which comprises multipliers and adders.

Figure 8:
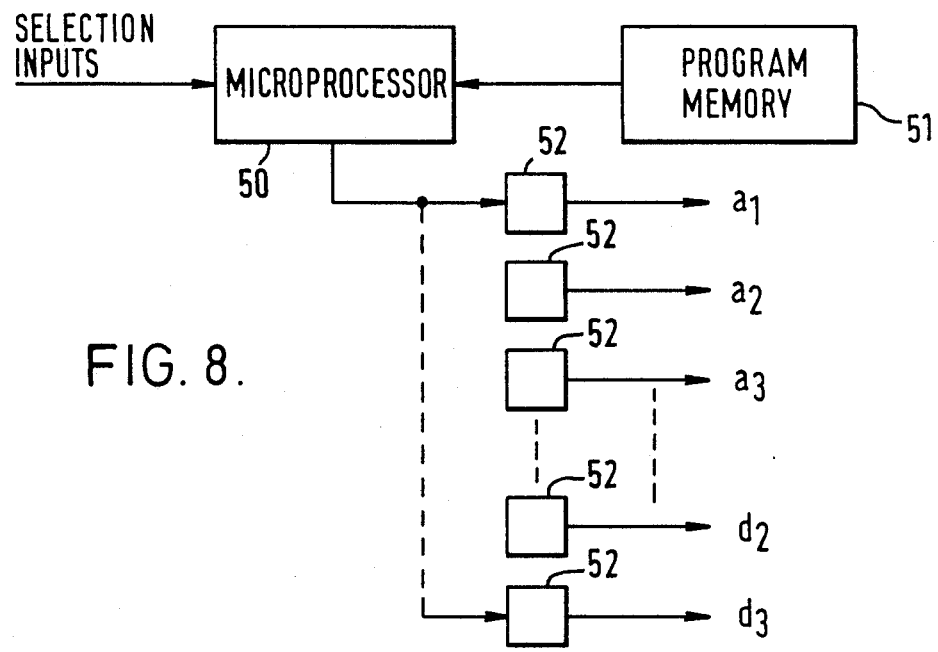
FIG. 8 shows in more detailed block form a part of a post-map matrix from FIG. 5.

An example of a video signal processing circuit which may be used as the post-map matrix 7 will now be described with reference to FIGS. 8 and 9.

As mentioned above, the mathematical operations which the post-map matrix 7 has to perform to achieve the three-dimensional effects of off-setting, scaling, rolling, yawing and pitching are known, for example, from "Computer Graphics and Applications" referred to above. However, in the present case the images may need to be processed in real time, that is, all the processing necessary for each field may need to be performed at the video field rate, which, in the present example is 60 fields per second. It is not possible for a computer to perform the processing at the required high speed, so the example comprises a hybrid arrangement comprising a high speed microprocessor and a hardware matrix circuit. Basically, the microprocessor is required to calculate the coefficients of a single 4×4 matrix which is, if necessary, a composite matrix combining the matrices corresponding respectively to two or more of off-setting, scaling, rolling, pitching or yawing.

Suppose that the three-dimensional input address of a pixel is x, y, z and that the output address, after a required transformation, of that pixel is x new, y new, z new. In the general case, therefore, where the precise transformation has not yet been specified:

$$x\ new = a_1 x + b_1 y + c_1 z + d_1$$

$$y\ new = a_2 x + b_2 y + c_2 z + d_2$$

$$z\ new = a_3 x + b_3 y + c_3 z + d_3$$

where $a_1$, $a_2$, $a_3$, $b_1$, $b_2$, $b_3$, $c_1$, $c_2$, $c_3$, $d_1$, $d_2$ and $d_3$ are coefficients determined by the transformation to be performed. Writing the above three equations in matrix form:

$$\begin{vmatrix} x\ new \\ y\ new \\ z\ new \end{vmatrix} = \begin{vmatrix} a_1 & b_1 & c_1 & d_1 \\ a_2 & b_2 & c_2 & d_2 \\ a_3 & b_3 & c_3 & d_3 \end{vmatrix} \begin{vmatrix} x \\ y \\ z \\ 1 \end{vmatrix}$$

To make the centre matrix 4×4, so as to permit multiplication of such matrices, this can be re-written as:

$$\begin{vmatrix} x\ new \\ y\ new \\ z\ new \\ 1 \end{vmatrix} = \begin{vmatrix} a_1 & b_1 & c_1 & d_1 \\ a_2 & b_2 & c_2 & d_2 \\ a_3 & b_3 & c_3 & d_3 \\ 0 & 0 & 0 & 1 \end{vmatrix} \begin{vmatrix} x \\ y \\ z \\ 1 \end{vmatrix}$$

Any one or any combination of the above three-dimensional linear effects of off-setting, scaling, rolling, pitching and yawing can be achieved by first selecting the appropriate matrix, or in the case of a combination selecting the appropriate matrices, substituting the required values of the parameters into the matrix or matrices, and, in the case of a combination multiplying the resulting matrices together. This first step is carried out by a microprocessor 50 shown in FIG. 8 under control of a program stored in a program memory 51 and selection inputs which specify which of the off-setting, scaling, rolling, pitching and yawing effects are required and, in the appropriate cases, the off-set distances, the scaling coefficients and the roll, pitch and yaw angles. Under control of the program, the microcomputer 50 then selects the appropriate 4×4 matrix or matrices, substitutes the parameters and, where necessary, multiplies the resulting matrices together to provide in each case an output matrix comprising the required coefficients $a_1$ to $d_3$ which are supplied to respective outputs by way of respective latch circuits 52. During each field period of the video signal to be processed the microprocessor 50 performs the above operations so that the required coefficients $a_1$ to $d_3$ are available for use in the next field period.

Figure 9:
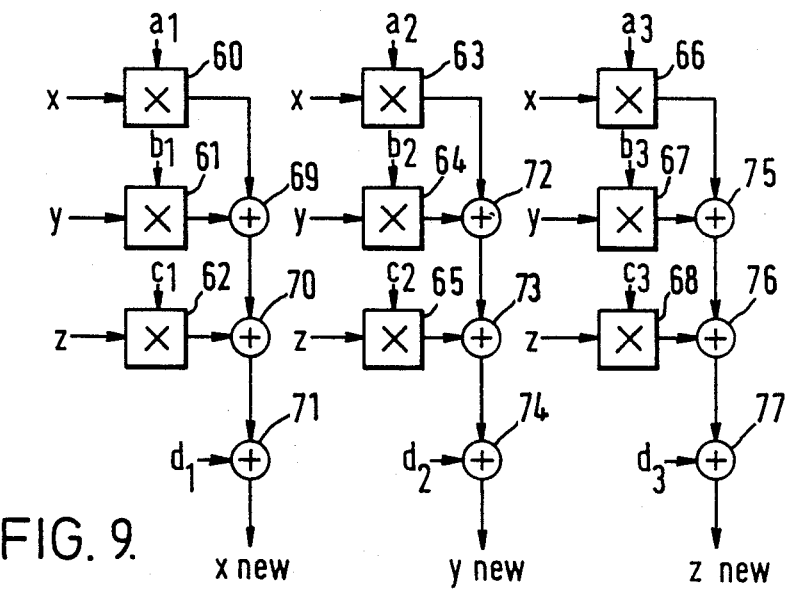
FIG. 9 shows in more detailed block form another part of the post-map matrix of FIG. 8.

The coefficients $a_1$ to $d_3$ are supplied to the hardware matrix circuit shown in block form in FIG. 9. The matrix circuit comprises nine multipliers 60 to 68 and nine adders 69 to 77. The output x new of each pixel in a field is derived by supplying the input coordinates x, y and z of that pixel to the multipliers 60, 61 and 62 respectively, where they are multiplied by the coefficients $a_1$, $b_1$ and $c_1$ respectively down-loaded from the microcomputer 50 (FIG. 8) at the end of the previous field. The output of the multipliers 60 and 61 are added by the adder 69, the output of the adder 69 is added to the output of the multiplier 62 by the adder 70, and the output of the adder 70 is added to the coefficient $d_1$ by the adder 71. The output of the adder 71 is x new. The outputs y new and z new are derived similarly.

The three output addresses x new, y new and z new, designated X'', Y'' and Z'' in FIG. 5, are supplied to the perspective transformation device 8.

The perspective transformation device 8 introduces geometrical perspective by adapting the X'' and Y'' addresses in dependence on the Z'' addresses and on the selected viewing distance. This again is a known technique and the way it is done is described in "Computer Graphics and Applications" referred to above. The need to effect perspective transformation will be understood from a very simple example. Suppose an initial two-dimensional rectangular image is hinged rearwards about a horizontal axis coinciding with the top edge of the image. As this is done each pixel in the image will acquire a Z address (which will be zero for pixels lying along the axis), but initially the length of the bottom edge of the image will remain the same as the length of the top edge of the image. In other words there will be no perspective effect to delude the eye that the movement is in three dimensions. The function of the perspective transformation device 8 is to add the required geometrical perspective effect, which in the above simple example involves foreshortening of the two-dimensional image: i.e., in the example shortening the bottom edge, and progressively shortening the intervening horizontal lines.

Figure 10:
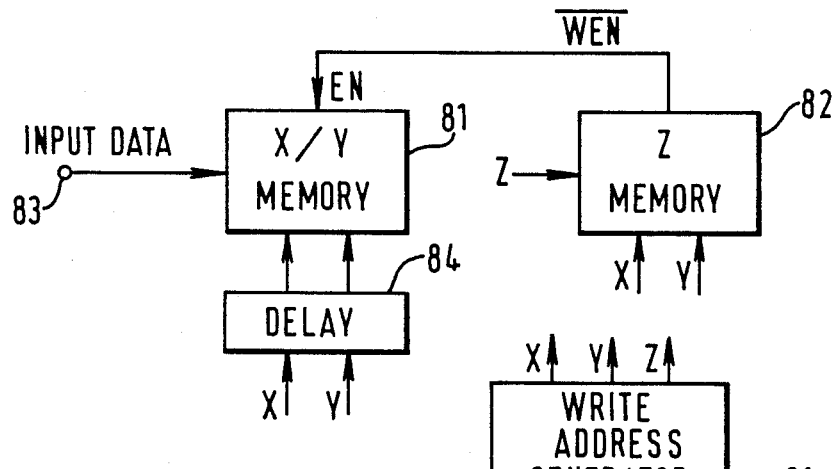
FIG. 10 shows in more detailed block form a memory device from FIG. 4.

Further consideration will now be given to hidden surface elimination, which was referred to above in connection with FIGS. 1 to 3, by further description of the field store arrangement of FIG. 4 with reference to FIG. 10 which shows one of the memories 9' or 9'' and the write address generator 31 in somewhat more detail. Each of the memories 9' and 9'' comprises a luminance/chrominance memory 81 and a Z memory 82, although as explained below the Z memory 82 is preferably common to the memories 9' and 9". The luminance/chrominance memory 81, hereinafter referred to as the X/Y memory 81, stores 8-bit words forming the pulse code modulated luminance and chrominance sample data, according to the two-dimensional or X and Y addresses of the individual samples, that is, according to the raster position of the sample in the plane of a television screen. Thus, in the above example the X/Y memory 81 is required to store data relating to 2048 samples for each of approximately 520 active scan lines. It is emphasized that the data stored in the X/Y memory 81 is information data relating to the actual values of the samples, that is luminance and chrominance (U/V) data.

The Z memory 82 stores 8-bit words representing the Z address, or depth information, for each of the luminance and chrominance sample data stored in the X/Y memory 81, and, as in the X/Y memory 81, this data is stored according to the two-dimensional X and Y addresses of the individual samples. It is, however, emphasized that the data stored in the Z memory 82 merely relates to the position of the sample in the Z or depth dimension and not to the actual value of the sample. The words stored in the Z memory 82 may be 8-bit words, but this is not essential, and words of shorter or longer length can be used depending on the accuracy with which it is required to resolve the positions of two samples which are closely adjacent to one another in the Z-dimension.

The write address generator 31 generates X, Y and Z address signals as described above. The X and Y address signals are supplied to the X/Y memory 81 and the X, Y and Z address signals are supplied to the Z memory 82. The input 8-bit data words supplied by way of an input 83 to the X/Y memory 81 are stored or not stored therein in dependence on a write enable signal $\overline{\text{WEN}}$ generated by a comparator circuit associated with the Z memory 82. This comparison is carried out before writing because the data written in the X/Y memory 81 relates to the output field to be read from the X/Y memory 81, and hence hidden surface data is not written therein. Thus, for each input data word presented to the X/Y memory 81, the comparator circuit checks the data held in the Z memory 82 in respect of that sample position with the Z address corresponding to the input data word, and the input data word is only written in the X/Y memory 81 if the Z address indicates that it is nearer to the viewing plane than any data already written in the X/Y memory 81 and corresponding to that sample position. For this purpose all the X/Y locations in the Z memory 82 are set to a zero datum level during the vertical blanking interval preceding each field. This zero datum level is chosen to correspond to the value of Z corresponding to the background data, which is at the furthest distance from the viewing plane. Because all the data in the Z memory 82 is reset in this way prior to each field, it will be appreciated that the Z memory 82 can be common to the memories 9' and 9" as indicated above. Because the comparator circuit requires some time to effect the comparison, the X and Y address signals are supplied to the X/Y memory 81 by way of a delay circuit 84, or alternatively are latched so as to be available if and when the write enable signal $\overline{\text{WEN}}$ is supplied.

Figure 11:
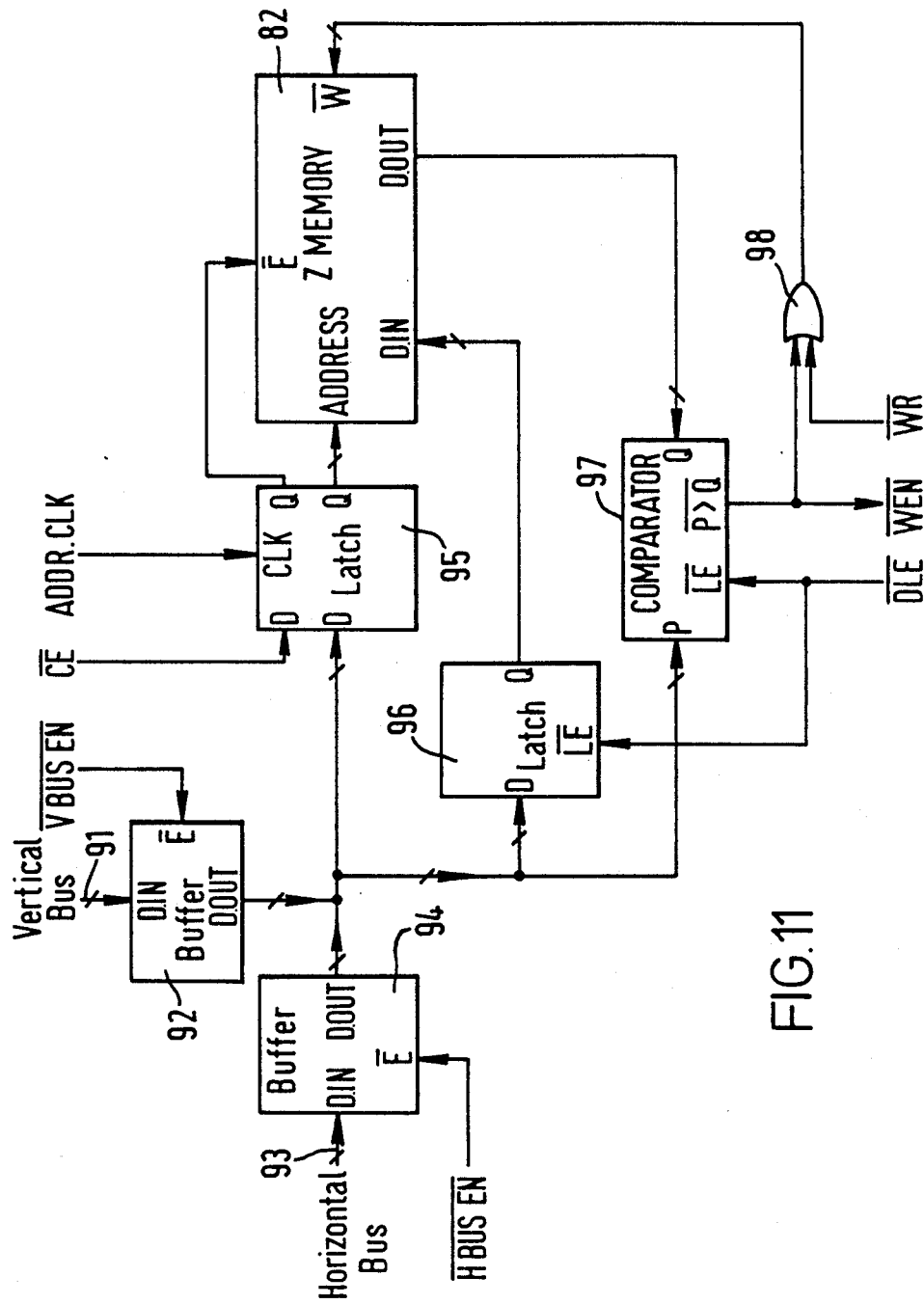
FIG. 11 shows in more detailed block form the memory device of FIG. 10.

The comparator circuit associated with the Z memory 82 will now be described in more detail with reference to FIG. 11.

The X and Y address signals, and also the Z address signals, which for convenience will hereinafter be referred to as the Z data, are supplied in common over a vertical bus 91 to a buffer circuit 92 or over a horizontal bus 93 to a buffer circuit 94.

Vertical and horizontal bus enable signals $\overline{\text{VBUSEN}}$ and $\overline{\text{HBUSEN}}$ are respectively supplied to the buffer circuits 92 and 94, and the outputs of the buffer circuits 92 and 94 are connected in common to a latch circuit 95, a latch circuit 96 and a comparator circuit 97. A chip enable signal $\overline{\text{CE}}$ and an address clock ADDRCLK are supplied to the latch circuit 95, which supplies outputs to an enable input and the address input of a random access memory (RAM) which forms the Z memory 82. The latch circuit 96 supplies an output to the data input of the Z memory 82, while a data output of the Z memory 82 is connected to a second input of the comparator circuit 97. A data latch enable signal $\overline{\text{DLE}}$ is supplied to the latch circuit 96 and to the comparator circuit 97, while the write enable signal $\overline{\text{WEN}}$ is developed by the comparator circuit 97 and supplied to the X/Y memory 81 (FIG. 10) and also to one input of an OR-circuit 98. To a second input of the OR-circuit 98 is supplied a write pulse $\overline{\text{WR}}$ and the output of the OR-circuit 98 is supplied to the write input of the Z memory 82.

The operation will now be described with reference also to FIG. 12 which is a time chart indicating rather more than one memory cycle time. Initially, one of the buffer circuits 92 or 94 will supply the X and Y address signals which will be latched in the latch circuit 95. Thereafter the Z data, or more accurately the new Z data relating to that sample position, is supplied by the buffer circuit 92 or 94 and is held in the latch circuit 96 and is also latched at the P input of the comparator circuit 97.

On receipt of the next address clock ADDRCLK the latch circuit 95 supplies the X and Y address signals to the Z memory 82 which, after an access time, supplies the old Z data stored at that address to the Q-input of the comparator circuit 97 where it is likewise latched. The new and the old Z data are then compared by the comparator circuit 97. If the new Z data is greater than the old Z data, that is to say if the new Z data relating to that pixel address represents a position in the Z direction nearer the viewing plane than the old Z data (or alternatively is the first input Z data received in respect of that pixel address in that field, in which case the new Z data will be greater than the old Z data because the old Z data is at the zero datum), then the comparator circuit 97 supplies the write enable signal $\overline{\text{WEN}}$.

Receipt of the write enable signal $\overline{\text{WEN}}$ by the X/Y memory 81 (FIG. 10) causes the input sample data relating to that X/Y position to be written (or over-written) in the appropriate position in the X/Y memory 81. Additionally, however, if the write enable signal $\overline{\text{WEN}}$ is present on the first input of the OR-circuit 98 at the time of the write pulse $\overline{\text{WR}}$, then the write pulse $\overline{\text{WR}}$ is supplied to the write input of the Z memory 82 and the new Z data is over-written at the appropriate X/Y position in the Z memory 82.

From the foregoing description it will be understood that embodiments of the invention can be used to produce images for animated scenes in video or cinematograph films. Depending on the input data used the content may range from substantial realism to complex science fiction. Such embodiments can in some cases generate real time motion and provide real time control of the movements of objects in three dimensions, for example, for use in flight simulators or other real time displays such as in a video game. Surface detail can readily be provided on complex shapes, and a large range of object shapes and surface details can be stored for selection and use. Background images can readily be incorporated and may be derived from moving or live video, and if required different resolutions can be used for the generated images of objects and the background.

It will be realized that many variations can be made in the precise form of the apparatus used and in the images generated and effects achieved, without departing from the scope of the appended claims.

We claim:

1. A method of generating an image, comprising the steps of:
   generating address data defining the three-dimensional shape of an object, including depth information relating thereto;
   storing video data defining the two-dimensional surface detail of said object;
   employing means including a hardware matrix circuit to manipulate said address data to move said object;
   perspective transforming said manipulated address data to form transformed address data defining a two-dimensional image of said object after said manipulation, said two-dimensional image being foreshortened in accordance with said depth information;
   filtering said video data in response to said data defining the two-dimensional surface detail and said transformed address data to reduce the amount of surface detail where the perspective transforming compresses the size of the object to which surface detail is to be applied;
   interpolating said video data in response to said data defining the two-dimensional surface detail and said transformed address data to derive additional data for the surface detail where the perspective transforming expands the size of the object to which the surface detail is to be applied; and
   using said transformed address data to control the writing of said video data into a store in the form of output video data defining a two-dimensional image of said object after said manipulation and said transformation, and with said surface detail.

2. A method according to claim 1 wherein said output video data is produced in real time to form a sequence of images for an immediate moving display.

3. A method according to claim 1 wherein said output video data is stored on a video tape or a video disc or film for subsequent display.

4. Apparatus for generating an image, the apparatus comprising:
   a first store for storing address data defining the three-dimensional shape of an object, including depth information relating thereto;
   a second store for storing video data defining the two-dimensional surface detail of said object;
   first means including a hardware matrix circuit for manipulating said address data to move said object;
   second means for perspective transforming said manipulated address data to form transformed address data defining a two-dimensional image of said object after said manipulation, said two-dimensional image being foreshortened in accordance with said depth information;
   filter means responsive to said second store and said perspective transforming means for filtering said video data in response to said transformed address data to reduce the amount of surface detail where the perspective transforming compresses the size of the object to which surface detail is to be applied;
   interpolating means responsive to said second store and said perspective transforming means for interpolating said video data in response to said transformed address data to derive additional data for the surface detail where the perspective transforming expands the size of the object to which the surface detail is to be applied; and
   a third store in which said video data is written, under control of said transformed address data, in the form of output video data defining a two-dimensional image of said object after said manipulation and said transformation, and with said surface detail.

5. Apparatus according to claim 4 further comprising a display device, and wherein said output video data is produced in real time to form a sequence of images for an immediate moving display on said display device.

6. Apparatus according to claim 4 further comprising a fourth store, comprising a video tape or a video disc or a film, to which said output video data is supplied for storage and subsequent display.

7. Apparatus according to claim 4 wherein said first means effects one or more linear manipulations of said address data, and said first means comprises:
   said hardware matrix circuit;
   a microprocessor comprising a memory in which is stored a respective n×m matrix corresponding to each said linear manipulation; and
   means for supplying selection inputs to said microprocessor to control said microprocessor to select said matrix, or for a visual effect involving a combination of two or more said linear manipulations, said matrices corresponding to said visual effect, to substitute into the selected matrix or matrices the respective parameters of said visual effect, for a visual effect involving a combination of two or more said linear manipulations to multiply the substituted matrices together, and to derive from the resulting matrix the coefficients required to calculate from input pixel addresses of said address data the output pixel addresses corresponding to said visual effect; and wherein
   said hardware matrix circuit is supplied with said coefficients and signals representing the coordinates of said input pixel addresses and is operative to derive therefrom the output pixel addresses corresponding to said visual effect.

8. Apparatus according to claim 7 wherein said visual effect is a two-dimensional effect, n is equal to 3, and said linear manipulation involves any one or more of off-setting, scaling and rolling.

9. Apparatus according to claim 7 wherein said visual effect is a three-dimensional effect, n is equal to 4, and said linear manipulation involves any one or more of off-setting, scaling, rolling, pitching and yawing.

10. Apparatus according to claim 4 wherein said transformed address data supplied by said second means comprises data relating to pixel addresses in a video field and, in association with said address data for each pixel, associated Z data indicating the apparent position of said pixel in a direction perpendicular to a video display of said video field; and wherein said third store comprises:
- a first memory means for storing said video data relating to each said pixel in said video field;
- a second memory means for storing said Z data relating to each said pixel in said video field;
- means for comparing for each said pixel in said video field the value of the input Z data with the Z data for that pixel stored in said second memory means and for supplying a write enable signal only if said value of said input Z data represents a pixel in front of that represented by said stored Z data; and
- means to write or over-write said video data into said first memory means and to over-write said new Z data into said second memory means under control of said write enable signal.

11. Apparatus according to claim 10 wherein said Z data stored in said second memory means are all reset to a zero datum during the vertical blanking interval between each said video field.

12. Apparatus according to claim 10 wherein said first memory means comprises a pair of memories which are alternately written in and read from in alternate said video fields.

13. Apparatus according to claim 4 further comprising means to supply to said third store background video data for incorporating into said output video data to form a still or moving background for the image of said object.

14. A method of generating an image, comprising the steps of:
- storing address data defining the three-dimensional shape of an object, including depth information relating thereto;
- storing video data defining the two-dimensional surface detail of said object;
- employing means including a hardware matrix circuit to manipulate said address data to move said object;
- perspective transforming said manipulated address data to form transformed address data defining a two-dimensional image of said object after said manipulation, said two-dimensional image being foreshortened in accordance with said depth information;
- filtering said video data in response to said data defining the two-dimensional surface detail and said transformed address data to reduce the amount of surface detail where the perspective transforming compresses the size of the object to which surface detail is to be applied;
- interpolating said video data in response to said data defining the two-dimensional surface detail and said transformed address data to derive additional data for the surface detail where the perspective transforming expands the size of the object to which the surface detail is to be applied; time and defining a two-dimensional image of said object after said manipulation and said transformation, and with said surface detail; and
- subsequently displaying said stored output video data.

* * * * *